US008634365B2

(12) United States Patent
Hammarwall et al.

(10) Patent No.: US 8,634,365 B2
(45) Date of Patent: Jan. 21, 2014

(54) SYSTEM AND METHOD FOR ALLOCATING TRANSMISSION RESOURCES

(75) Inventors: David Hammarwall, Stockholm (SE); George Jöngren, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 274 days.

(21) Appl. No.: 13/095,313

(22) Filed: Apr. 27, 2011

(65) Prior Publication Data
US 2011/0268058 A1 Nov. 3, 2011

Related U.S. Application Data

(60) Provisional application No. 61/329,195, filed on Apr. 29, 2010.

(51) Int. Cl.
*H04W 4/00* (2009.01)
*H04J 11/00* (2006.01)
*H04J 13/00* (2011.01)

(52) U.S. Cl.
USPC .................... 370/329; 370/203; 370/479

(58) Field of Classification Search
None
See application file for complete search history.

(56) References Cited

U.S. PATENT DOCUMENTS

| 8,094,747 | B2* | 1/2012 | Zhang et al. | 375/295 |
|---|---|---|---|---|
| 2011/0249590 | A1* | 10/2011 | Blankenship et al. | 370/252 |
| 2011/0274075 | A1* | 11/2011 | Lee et al. | 370/329 |
| 2012/0076221 | A1* | 3/2012 | Zhang et al. | 375/260 |
| 2012/0182942 | A1* | 7/2012 | Ghosh et al. | 370/328 |
| 2013/0039334 | A1* | 2/2013 | Han et al. | 370/330 |

OTHER PUBLICATIONS

3GPP 3rd Generation Partnership Project: Technical Specification Group Radio Access Network; Evolved Universal Terrestrial Radio Access (E-UTRA); Multiplexing and Channel Coding (Release 9) 3GPP TS 36.212 v9.1.0. (Mar. 2010).

* cited by examiner

*Primary Examiner* — Clemence Han (57) ABSTRACT

A method for wirelessly transmitting data using a plurality of transmission layers includes estimating a number of vector symbols to be allocated to transmission of user data codewords during a subframe and determining a number of bits in a plurality of user data codewords to be transmitted during the subframe. The method also includes calculating a number of control vector symbols to allocate to control information based at least in part on the estimated number of vector symbols and the determined number of bits. Additionally, the method includes mapping control codewords to the calculated number of control vector symbols and transmitting vector symbols carrying the user data codewords and the control codewords over the plurality of transmission layers during the subframe.

26 Claims, 5 Drawing Sheets

SYSTEM AND METHOD FOR ALLOCATING TRANSMISSION RESOURCES

PRIORITY CLAIM UNDER 35 U.S.C. & 119(e)

This application claims the benefit of U.S. Provisional Application No. 61/329,195, filed Apr. 29, 2010, entitled "Resource Allocation of Control Multiplexed with Data in Multiple Antenna Transmissions," which is incorporated by reference in its entirety.

TECHNICAL FIELD OF THE INVENTION

This disclosure relates in general to wireless communication and, more particularly, to resource allocation for multi-antenna transmissions.

BACKGROUND OF THE INVENTION

Multi-antenna transmission techniques can significantly increase the data rates and reliability of wireless communication systems, especially in systems where the transmitter and the receiver are both equipped with multiple antennas to permit the use of multiple-input multiple-output (MIMO) transmission techniques. Advanced communication standards such as Long Term Evolution (LTE) Advanced utilize MIMO transmission techniques that may permit data to be transmitted over multiple different spatially-multiplexed channels simultaneously, thereby significantly increasing data throughput.

While MIMO transmission techniques can significantly increase throughput, such techniques can greatly increase the complexity of managing radio channels. Additionally, many advanced communication technologies, such as LTE, rely on a substantial amount of control signaling to optimize the configuration of transmitting devices and their use of the shared radio channel. Because of the increased amount of control signaling in advanced communication technologies, it is often necessary for user data and control signaling to share transmission resources. For example, in LTE systems, control signaling and user data are, in certain situations, multiplexed by user equipment ("UE") for transmission over a physical uplink shared channel ("PUSCH").

However, conventional solutions for allocating transmission resources are designed for use with single layer transmission schemes in which only a single codeword of user data is transmitted at a time. As a result, such resource allocation solutions fail to provide optimal allocation of transmission resources between control information and user data when MIMO techniques are being utilized to transmit data on multiple layers simultaneously.

SUMMARY OF THE INVENTION

In accordance with the present disclosure, certain disadvantages and problems associated with wireless communication have been substantially reduced or eliminated. In particular, certain devices and techniques for allocating transmission resources between control information and user data are described.

In accordance with one embodiment of the present disclosure, a method for wirelessly transmitting data using a plurality of transmission layers includes estimating a number of vector symbols to be allocated to transmission of user data codewords during a subframe and determining a number of bits in a plurality of user data codewords to be transmitted during the subframe. The method also includes calculating a number of control vector symbols to allocate to control information based at least in part on the estimated number of vector symbols and the determined number of bits. Additionally, the method includes mapping control codewords to the calculated number of control vector symbols and transmitting vector symbols carrying the user data codewords and the control codewords over the plurality of transmission layers during the subframe.

In accordance with one embodiment of the present disclosure, a method for receiving user data and control codewords transmitted wirelessly over a plurality of transmission layers includes receiving a plurality of vector symbols over a plurality of transmission layers. The vector symbols carry user data codewords and control codewords. The method includes estimating a number of the vector symbols that have been allocated to user data codewords and determining a number of bits in a plurality of user data codewords carried by the vector symbols. Additionally, the method includes calculating a number of control vector symbols that have been allocated to control information based at least in part on the estimated number of vector symbols and the determined number of bits and decoding the received vector symbols based on the calculated number of control vector symbols.

In accordance with another embodiment, a method of scheduling wireless transmissions over a plurality of transmission layers includes receiving a scheduling request from a transmitter requesting use of transmission resources to transmit a plurality of vector symbols. The method also includes determining a transmission rank, a total number of vector symbols to be used for user data and control information, and a number of bits of user data to be carried by each of the user data codewords, accounting, at least in part, for an estimated number of control vector symbols. The estimated number of control vector symbols is determined by estimating a number of user data vector symbols to be used in transmitting the user data codewords, estimating a number of bits of one or more control codewords to be transmitted, and calculating the estimated number of control vector symbols to be used in transmitting the user data codewords based at least in part on the estimated number of user data vector symbols to be used in transmitting the user data codewords, the estimated number of bits of the one or more control codewords, and the number of bits of user data to be carried by each of the user data codewords. Additionally, the method includes generating a response to the scheduling request based on the determined transmission rank, total number of vector symbols, and number of bits of each user data codeword and transmitting the response to the transmitter.

Additional embodiments include apparatuses capable of implementing the above methods and/or variations thereof.

Important technical advantages of certain embodiments of the present invention include reducing the overhead associated with transmitting control signaling by matching the allocation to the quality of the channel indicated by the payloads of the data codewords. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
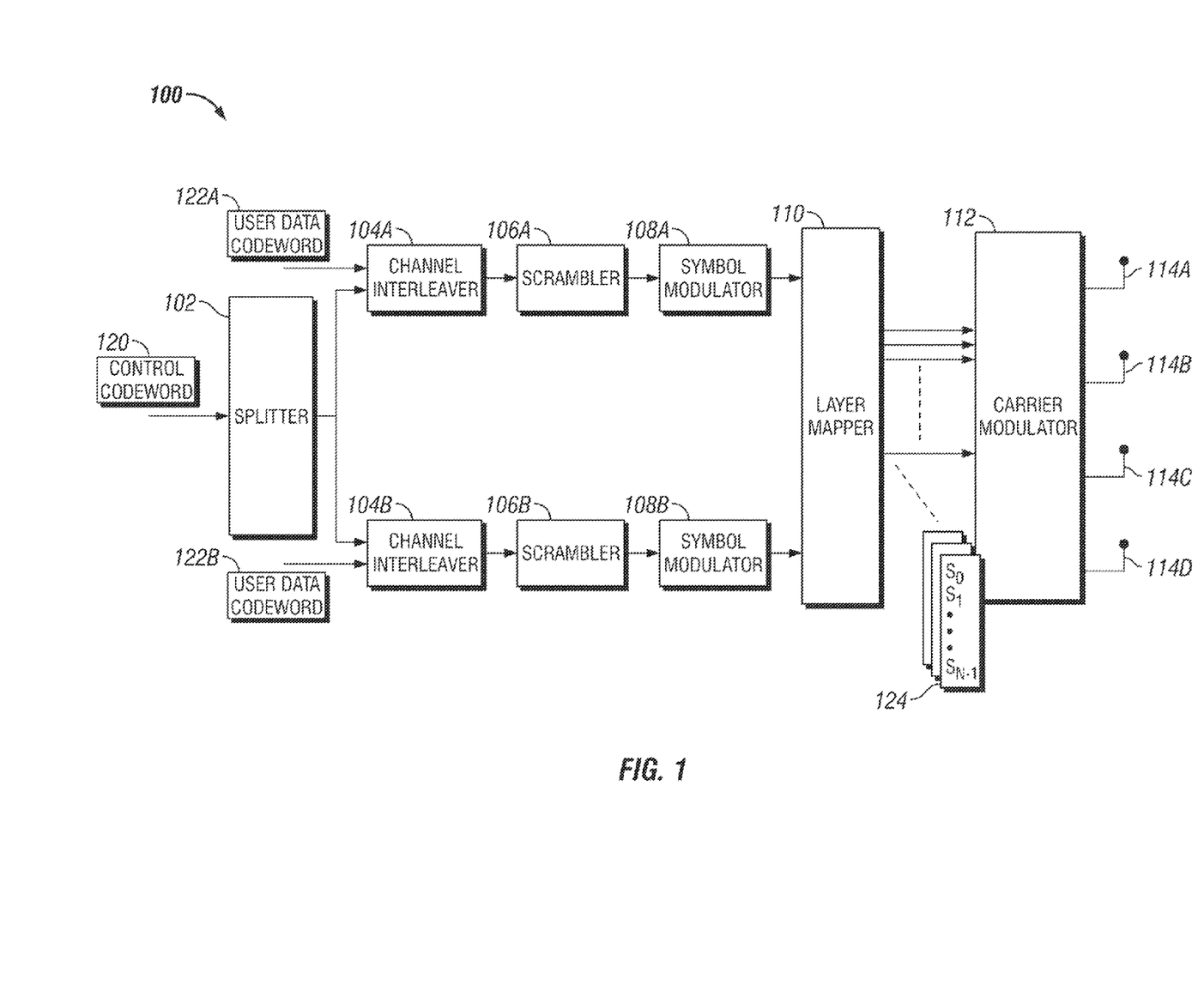
FIG. 1 is a functional block diagram illustrating a particular embodiment of a multi-antenna transmitter.

FIG. 1 is a functional block diagram illustrating a particular embodiment of a multi-antenna transmitter 100. In particular, FIG. 1 shows a transmitter 100 configured to multiplex certain control signaling with user data for transmission over a single radio channel. The illustrated embodiment of transmitter 100 includes a splitter 102, a plurality of channel interleavers 104, a plurality of scramblers 106, a plurality of symbol modulators 108, a layer mapper 110, and a carrier modulator 112. Transmitter 100 allocates transmission resources to control signaling on multiple transmission layers based on an estimate of the quality of the radio channel over which transmitter 100 will transmit. As described further below, particular embodiments of transmitter 100 reduce the overhead for transmitted control information by using an estimate of the data payloads of multiple layers and/or codewords as a measure of the channel quality.

Control signaling can have a critical impact on the performance of wireless communication systems. As used herein, "control signaling" and "control information" refers to any information communicated between components for purposes of establishing communication, any parameters to be used by one or both of the components in communicating with one another (e.g., parameters relating to modulation, encoding schemes, antenna configurations), any information indicating receipt or non-receipt of transmissions, and/or any other form of control information. For example, in LTE systems, control signaling in the uplink direction includes, for example, Hybrid Automatic Repeat reQuest (HARQ) Acknowledgments/Negative Acknowledgements (ACK/NAKs), precoder matrix indicators (PMIs), rank indicators (RIs), and channel quality indicators (CQIs), which are all used by the eNodeB to get confirmation of successful reception of transport blocks or to improve the performance of downlink transmissions. Although control signaling is often transmitted on separate control channels, such as the physical uplink control channel (PUCCH) in LTE, it may be beneficial or necessary to transmit control signaling on the same channel as other data.

For example, in LTE systems, when a periodic PUCCH allocation coincides with a scheduling grant for a user equipment (UE) to transmit user data, the user data and control signaling share transmission resources to preserve the single-carrier property of the discrete Fourier transform, spread orthogonal frequency-division multiplexing (DFTS-OFDM) transmission techniques used by LTE UEs. Furthermore, when a UE receives a scheduling grant to transmit data on the physical uplink shared channel (PUSCH), it typically receives information from the eNodeB related to the characteristics of the uplink radio propagation channel and other parameters that can be used to improve the efficiency of PUSCH transmissions. Such information may include modulation and coding scheme (MCS) indicators as well as, for UEs capable of using multiple transmission antennas, PMIs or RIs. As a result, UEs may be able to use this information to optimize PUSCH transmissions for the radio channel, thereby increasing the amount of data that can be transmitted for a given set of transmission resources. Thus, by multiplexing control signaling with the user data transmitted on PUSCH, a UE can support significantly larger control payloads than when transmitting control signaling by itself on PUCCH.

It may be possible to multiplex control signaling and user data by simply dedicating a set amount of the time-domain transmission resources to control information and then perform carrier modulation and precoding of the control signaling along with the data. In this way control and data are multiplexed and transmitted in parallel on all sub-carriers. For example, in LTE Release 8, DFTS-OFDM symbols are formed from a predetermined number of information vector symbols. As used herein, a "vector symbol" may represent any collection of information that includes an information element associated with each transmission layer over which the information is to be transmitted. Assuming a normal cyclic prefix length, fourteen of these DFTS-OFDM symbols can be transmitted in each uplink subframe. A predetermined number and distribution of these symbols are used to transmit various types of control signaling and the remaining symbols may be used to transmit user data.

However, the amount of control signaling to be multiplexed on a data transmission is typically much fewer than the amount of user data. Moreover, since control signaling and user data may each be associated with different block error-rate requirements, control signaling is often encoded separately and using a different encoding scheme from user data. For example, user data is often encoded with turbo codes or low-density parity-check (LDPC) codes that are highly efficient for longer block lengths (i.e., larger blocks of information bits). Control signaling that uses only a small amount of information bits, such as HARQ ACK/NAK signaling or rank indicators, is often most efficiently encoded using a block code. For medium-sized control signaling, such as larger size CQI reports, a convolutional code (possibly tail biting) often provides the best performance. Consequently, fixed or predetermined allocations of transmission resources to control signaling and user data can lead to inefficient use of such resources as the optimal resource allocation will often depend on numerous factors, including the channel quality, the type of control signaling, and various other considerations.

The use of multiple transmit antennas can further complicate the allocation of transmission resources between control signaling and user data when the two types of information are multiplexed together on a common channel. When MIMO techniques are used to simultaneously transmit multiple data codewords in parallel, control signaling may be transmitted on multiple different codewords and/or layers of the transmission scheme. The optimal allocation of resources in such situations may differ from the optimal allocation under the same circumstances when a single transmission antenna is used. Moreover, the multiple-antenna technique used for control signaling may be different from that used for user data. Control signaling is often encoded for maximum robustness (e.g., with maximum transmission diversity) rather than for maximum throughput. By contrast, user data is often combined with a retransmission mechanism that allows for more throughput-aggressive multiple-antenna encoding techniques. Thus, if transmitter 100 has information indicating the supported payload of user data, transmitter 100 may not be able to assume the supported payload for control signaling is the same when determining the optimal allocation of transmission resources for control signaling. For example, the supported peak spectral efficiency of the encoded user data may be significantly larger than the supported peak spectral efficiency of the encoded control signaling.

Thus, particular embodiments of transmitter 100 determine an allocation of transmission resources across multiple codewords and/or transmission layers for control signaling on a channel in which control signaling and user data are multiplexed. More specifically, particular embodiments of transmitter 100 use the data payloads of the multiple layers or codewords to estimate the spectral efficiency supported by the multi-layer encoding scheme currently being used by transmitter 100 for control signaling. Based on this estimated spectral efficiency, transmitter 100 may then determine the amount of transmission resources (e.g., the number of vector symbols) to use for control signaling.

Turning to the example embodiment illustrated by FIG. 1, transmitter 100, in operation, generates or receives control codewords and data codewords (represented, in FIG. 1, by control codeword 120 and data codewords 122a and 122b, respectively) for transmission to a receiver over a radio channel. To permit multiplexing of control codewords 120 and data codewords 122 over a common channel, splitter 102 splits control codeword 120 for use by multiple channel interleavers 104. Splitter 102 may split control codeword 120 in any appropriate manner between channel interleavers 104, outputting a complete copy or some suitable portion on each datapath. As one example, splitter 102 may split control codeword 120 for use in the multiple datapaths by replicating control codeword 120 on both datapaths, outputting a complete copy of control codeword 120 to each channel interleaver 104. As another example, splitter 102 may split control codeword 120 by performing serial-to-parallel conversion of control codeword 120, outputting a unique portion of control codeword 120 to each channel interleaver 104.

Channel interleavers 104 each interleave a data codeword 122 with control codeword 120 (either a complete copy of control codeword 120, a particular portion of control codeword 120, or a combination of both, depending on the configuration of splitter 102). Channel interleavers 104 may be configured to interleave data codewords 122 and control codeword 120 so that layer mapper 110 will map them to vector symbols in a desired manner. The interleaved outputs of channel interleavers 104 are then scrambled by scramblers 106 and modulated by symbol modulators 108.

The symbols output by symbol modulators 108 are mapped to transmission layers by layer mapper 110. Layer mapper 110 outputs a series of vector symbols 124 that are provided to carrier modulator 112. As an example, for embodiments of transmitter 100 that support LTE, each vector symbol 124 may represent an associated group of modulation symbols that are to be transmitted simultaneously on different transmission layers. Each modulation symbol in a particular vector symbol 124 is associated with a specific layer over which that modulation symbol will be transmitted.

After layer mapper 110 maps the received symbols into vector symbols 124, carrier modulator 112 modulates information from the resulting vector symbols 124 onto a plurality of radiofrequency (RF) subcarrier signals. Depending on the communication technologies supported by transmitter 100, carrier modulator 112 may also process the vector symbols 124 to prepare them for transmission, such as by precoding vector symbols 124. The operation of an example embodiment of carrier modulator 112 for LTE implementations is described in greater detail below with respect to FIG. 2. After any appropriate processing, carrier modulator 112 then transmits the modulated subcarriers over a plurality of transmission antennas 114.

As explained above, proper allocation of transmission resources to control signaling and user data may have a significant impact on the performance of transmitter 100. In particular embodiments, this allocation of transmission resources is reflected in the number of vector symbols 124 transmitter 100 uses to transmit a particular control codeword 120. Transmitter 100 may determine the number of vector symbols 124 to use for a particular control codeword 120 based on a measure of the quality of the channel or some other indication of the likelihood that the receiver will erroneously detect control codeword 120 after being transmitted over the radio channel. In particular, certain embodiments of transmitter 100 may use the data payload of the multiple layers or codewords that will be used to transmit control codewords 120 (or a subset of such layers/codewords) to estimate the spectral efficiency currently supported by the multi-layer encoding scheme to be used. In particular embodiments, transmitter 100 determines a data payload for the multiple layers or codewords based on information included in a scheduling grant received by transmitter. Such information may include any suitable information from which transmitter 100 can directly or indirectly determine the data payload to be used for the multiple layers or codewords. For example, transmitter 100 may receive a scheduling grant that includes a total resource allocation, a coding rate, and a modulation scheme, and may determine from this information, the data payload of the transmission layers transmitter 100 will be using for the transmission. Using the determined payload, transmitter 100 may then determine an estimate of the spectral efficiency for the current allocation.

Based on this estimate of the spectral efficiency, transmitter 100 may determine the number of vector symbols 124 to use in transmitting the relevant control codewords 120. Transmitter 100 may use the data payload of the multiple layers or codewords and/or the estimated spectral efficiency to determine the number of vector symbols 124 to allocate to control signaling (referred to herein as "control vector symbols") in any suitable manner. As one example, transmitter 100 may determine the number of vector symbols 124 to allocate to the transmission of control codewords 120 for a given time period (assumed here, for purposes of illustration, to be a subframe) based, at least in part, on the value (Q') resulting from the following equation:

$$Q' = \min\left(\left\lceil O \cdot f\left(Q_{data}, \sum_{r=0}^{C_n-1} K_{0,r}, 5, \sum_{r=0}^{C_n-1} K_{N_{CW}-1,r}\right) \cdot \beta_{offset}^{PUSCH} \right\rceil, Q'_{max}\right) \quad \text{Equation (1)}$$

where O is the number of information bits of control codewords 120 to be transmitted for the subframe (which may also include cyclic redundancy check (CRC) bits if CRC is used by the relevant control codewords 120), and $$f\left(\hat{Q}_{data}, \sum_{r=0}^{C_n-1} K_{0,r}, 5, \sum_{r=0}^{C_n-1} K_{N_{CW}-1,r}\right)$$

is a function that, given an estimate of the number of vector symbols 124 that will be allocated to transmitting user data codewords 122 ($\hat{Q}_{data}$)(such vector symbols referred to herein as "user data vector symbols"), maps the data payloads $$\left(\sum_{r=0}^{C_n-1} K_{n,r}\right)$$

of each of the $N_{CW}$ user data codewords 122 into an estimate of the number of vector symbols 124 to be used for each bit of the control codewords 120 to be transmitted during the subframe.

As shown by Equation 1, transmitter 100 may utilize a configurable offset ($\beta_{offset}^{PUSCH}$) to scale or otherwise adjust the estimated number of vector symbols 124 to be used for control signaling. (Note that in this context there is a linear ambiguity between $f(\bullet)$ and $\beta_{offset}^{PUSCH}$, in that a constant scaling can be absorbed either by $f(\bullet)$ or by $\beta_{offset}^{PUSCH}$; that is, the pair $\lfloor f(\bullet), \beta_{offset}^{PUSCH} \rfloor$, is considered equivalent to the pair $\lfloor \tilde{f}(\bullet), \tilde{\beta}_{offset}^{PUSCH} \rfloor$, where $$\tilde{f}(\cdot) = \frac{f(\cdot)}{c},$$

and $\tilde{\beta}_{offset}^{PUSCH} = c \cdot \beta_{offset}^{PUSCH}$.) Additionally, as also indicated by Equation 1, particular embodiments of transmitter 100 may use a maximum threshold ($Q'_{max}$) to limit the maximum amount of transmission resources that may be allocated to control codewords 120 for the subframe. Furthermore, as indicated by the $\lceil \rceil$ operator in Equation 1, particular embodiments of transmitter 100 may round, truncate, or otherwise map the estimated (or scaled) number of control vector symbols 124 to an integer value, such as by applying the ceiling operator to the scaled value as shown.

As another example of how transmitter 100 may perform this resource allocation, particular embodiments of transmitter 100 may use, a specific version of Equation 1 in which the value for the data payload per data codeword 122 in the above formula for $f(\bullet)$ is replaced by the number of data bits per layer. That is, transmitter 100 may determine, for each data codeword 122 to be transmitted, the product of the data payload for that data codeword 122 and the number of layers over which the relevant data codeword 122 will be transmitted. Transmitter 100 may then sum these products and use a version of $f(\bullet)$ in which $$\sum_{r=0}^{C_n-1} K_{n,r}$$

is replaced by this sum.

As another example of how transmitter 100 may perform this resource allocation, transmitter 100 may estimate the number ($\hat{Q}_{data}$) of vector symbols 124 that will be allocated to the transmission of data codewords 122 by assuming that all transmission resources available for the relevant subframe will be used to transmit data codewords 122. Thus, transmitter 100 may input a value of $\hat{Q}_{data} = M_{sc}^{PUSCH-initial} \cdot N_{symb}^{PUSCH-initial}$ into $f(\bullet)$, where $M_{sc}^{PUSCH-initial}$ is the total number of subcarriers scheduled for use by transmitter 100 in the relevant subframe, and $N_{symb}^{PUSCH-initial}$ is the total number of vector symbols 124 scheduled for use by transmitter 100 in transmitting both control and data in the relevant subframe. If the transmission in question is a retransmission of previously transmitted information, the relevant subframe may be the subframe in which the transmission was originally transmitted and the values $M_{sc}^{PUSCH-initial}$ and $N_{symb}^{PUSCH-initial}$ may relate to the transmission resources allocated to transmitter 100 during the subframe in which the information was originally transmitted. In such embodiments, transmitter 100 overestimates the amount of resources that will be used for transmitting control codewords 120 as a tradeoff for simplifying the allocation determination.

As yet another example, in some embodiments, transmitter 100 may use a specific version of $f( )$ in which $f( )$ is a function of the total data payload summed over all data codewords 122 to be transmitted during the subframe. That is:

$$f\left(\hat{Q}_{data}, \sum_{r=0}^{C_n-1} K_{0,r}, 5, \sum_{r=0}^{C_n-1} K_{N_{CW}-1,r}\right) = \quad \text{Equation (2)}$$

$$f\left(\hat{Q}_{data}, \sum_{n=0}^{N_{CW}-1} \sum_{r=0}^{C_n-1} K_{n,r}\right).$$

By using this version of $f( )$, such embodiments may provide another option for simplifying the allocation determination, but the estimated number of vector symbols 124 may reflect the total rate that can be achieved for the user data transmission.

As another example of how transmitter 100 may implement this resource allocation, particular embodiments of transmitter 100 may use yet another version of $f( )$ in which:

$$f\left(\hat{Q}_{data}, \sum_{r=0}^{C_n-1} K_{0,r}, 5, \sum_{r=0}^{C_n-1} K_{N_{CW}-1,r}\right) = \frac{\hat{Q}_{data}}{g\left(\sum_{n=0}^{N_{CW}-1} \sum_{r=0}^{C_n-1} K_{n,r}\right)} \quad \text{Equation (3)}$$

where $g(\bullet)$ is a function whose dependence on $$\sum_{r=0}^{C_n-1} K_{0,r}, 5, \sum_{r=0}^{C_n-1} K_{N_{CW}-1,r}$$

is given by $$\sum_{n=0}^{N_{CW}-1} \sum_{r=0}^{C_n-1} K_{n,r}.$$

For example, in particular embodiments:

$$g\left(\sum_{n=0}^{N_{CW}-1} \sum_{r=0}^{C_n-1} K_{n,r}\right) = \sum_{n=0}^{N_{CW}-1} \sum_{r=0}^{C_n-1} K_{n,r} \quad \text{Equation (4)}$$

This version of $f(\ )$ may provide the advantage that the spectral efficiency of the control vector symbols 124 will be proportional to the spectral efficiency of user vector symbols 124. This result may be particularly useful when control codewords 120 are encoded using a similar level of spatial multiplexing as data codewords 122.

As still another example, particular embodiments of transmitter 100 may use a specific version of $f(\ )$ in which:

$$f\left(\hat{Q}_{data}, \sum_{r=0}^{C_n-1} K_{0,r}, 5, \sum_{r=0}^{C_n-1} K_{N_{CW}-1,r}\right) = \max\left(\alpha \cdot \frac{\hat{Q}_{data}}{g\left(\sum_{n=0}^{N_{CW}-1} \sum_{r=0}^{C_n-1} K_{n,r}\right)}, f_{min}\right) \quad \text{Equation (5)}$$

where $f_{min}$ is a minimum value of $f(\bullet)$, and $\alpha$ is a tuning parameter for improved performance. This version of $f(\ )$ may provide the advantage that when the peak spectral efficiency of the control multi-layer encoding scheme is lower than that of the data encoding schemes, the spectral efficiency on the control vector symbols 124 can be made to saturate within a supported level. As shown by Equation (5), such embodiments may use a value ($\alpha$) to scale the estimated spectral efficiency based on relevant considerations. For example, in particular embodiments, $\alpha$ is a function of the transmission rank transmitter 100 will use for the transmission—that is, $\alpha=\alpha(r)$. Similarly, in particular embodiments, $\alpha$ is a function of the total number of layers over which just control codewords will be transmitted. In alternative embodiments, however, $\alpha$ is set to an identify value—that is, $\alpha=1$.

As still another example, certain embodiments of transmitter 100 make the resource allocation determination based on a minimum payload per layer value. For example, such embodiments may use a version of $f(\ )$ such that:

$$f\left(\hat{Q}_{data}, \sum_{r=0}^{C_n-1} K_{0,r}, 5, \sum_{r=0}^{C_n-1} K_{N_{CW}-1,r}\right) = f\left(\hat{Q}_{data}, \min\left(\frac{\sum_{r=0}^{C_n-1} K_{0,r}}{l_0}, 5, \frac{\sum_{r=0}^{C_n-1} K_{N_{CW}-1,r}}{l_{N_{CW}-1}}\right)\right) \quad \text{Equation (6)}$$

where $l_k$ is the number of layers on which codeword k is mapped. Certain of such embodiments may use a specific version of $f(\ )$ such that:

$$f\left(\hat{Q}_{data}, \sum_{r=0}^{C_n-1} K_{0,r}, 5, \sum_{r=0}^{C_n-1} K_{N_{CW}-1,r}\right) = \frac{\hat{Q}_{data}}{\min\left(\frac{\sum_{r=0}^{C_n-1} K_{0,r}}{l_0}, 5, \frac{\sum_{r=0}^{C_n-1} K_{N_{CW}-1,r}}{l_{N_{CW}-1}}\right) \cdot \sum_{k=0}^{N_{CW}-1} l_k} \quad \text{Equation (7)}$$

Using the minimum payload per layer to determine resource allocation provides the benefit of increased robustness as the spectral efficiency for control signaling is matched to the spectral efficiency of the weakest layer for user data transmission.

Furthermore, certain embodiments of transmitter 100 determine resource allocation based only on the payloads of a subset of user data codewords 122. For example, in particular embodiments, $f(\bullet)$ is expressed as $$f\left(\hat{Q}_{data}, \sum_{r=0}^{C_n-1} K_{0,r}, 5, \sum_{r=0}^{C_n-1} K_{N_{CW}-1,r}\right) = f\left(\hat{Q}_{data}, \sum_{r=0}^{C_n-1} K_{S(0),r}, 5, \sum_{r=0}^{C_n-1} K_{S(|S|-1),r}\right) \quad \text{Equation (8)}$$

where S denotes a set of codeword indices and |S| denotes the number of elements in S, and $S(0), 5, S(|S(0)|-1)$ is an enumeration of the elements in S. Using only a subset of the codewords to determine resource allocation may be beneficial when the control signaling is mapped only to a subset of the transmission layers, corresponding to the data codewords indicated by S.

Thus, transmitter 100 may provide improved resource allocation techniques in a variety of different forms. Using these resource allocation techniques, certain embodiments of transmitter 100 may be able to match the allocation of control-signaling transmission resources to the quality of the relevant radio channel and to account for the use of multiple codewords or layers in making the allocation. As a result, such embodiments may reduce the amount of overhead used to transmit control signaling when the control signaling is multiplexed with user data. Consequently, certain embodiments of transmitter 100 may provide multiple operational benefits. Specific embodiments, however, may provide some, none, or all of these benefits.

Figure 5:
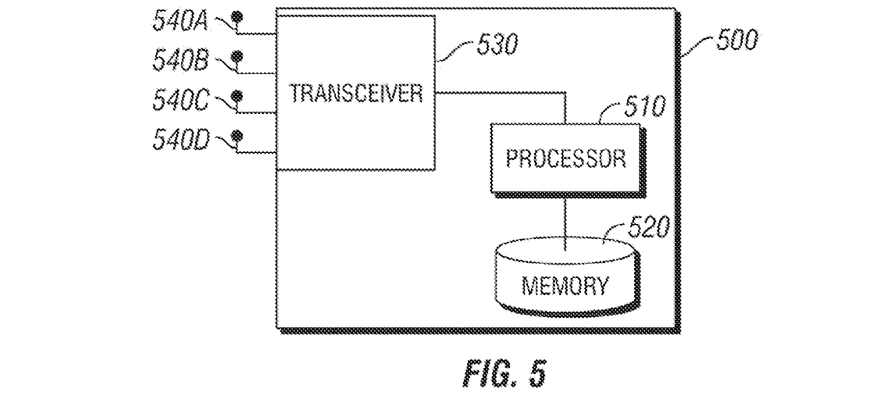
FIG. 5 is a structural block diagram showing the contents of a network node that is responsible for receiving and/or scheduling transmissions of the transmitter.
Figure 6:
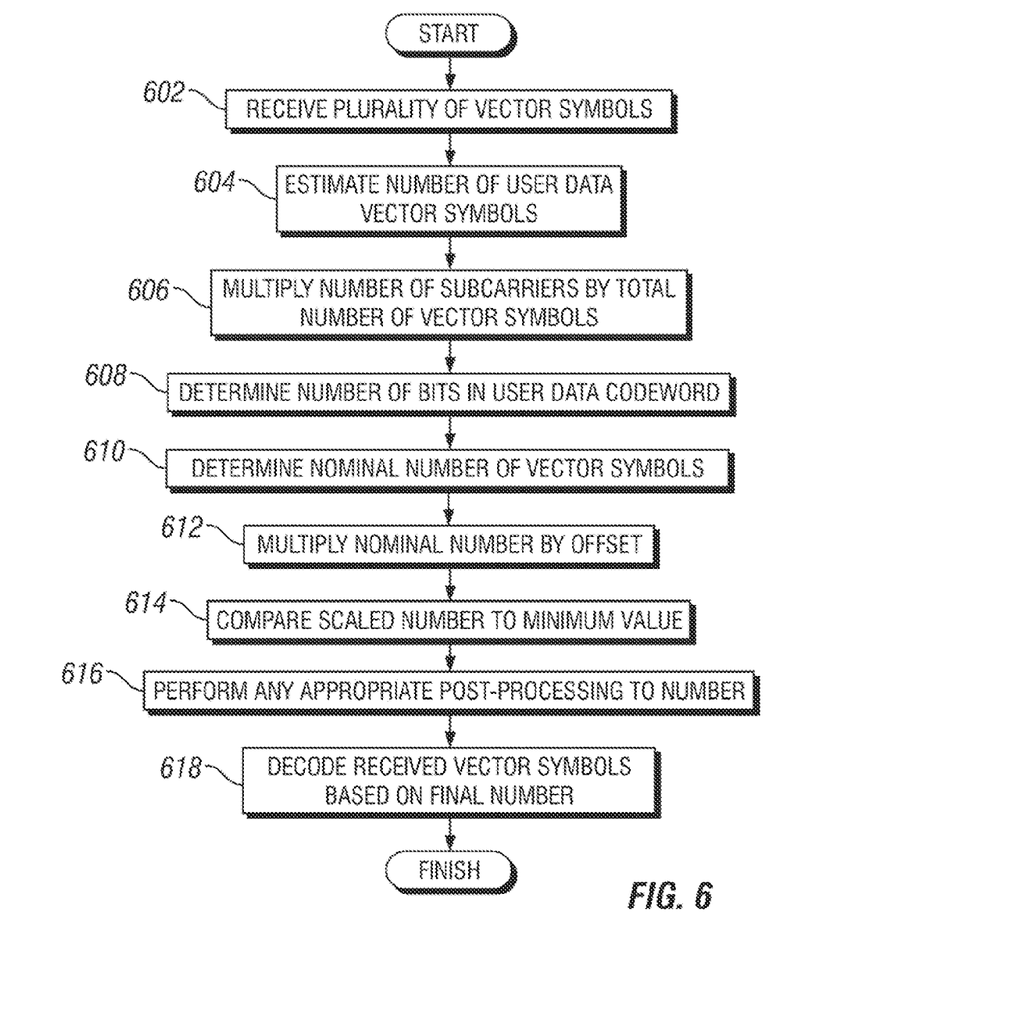
FIG. 6 is a flowchart showing example operation of a particular embodiment of the network node of FIG. 5 in receiving transmissions from the transmitter.
Figure 7:
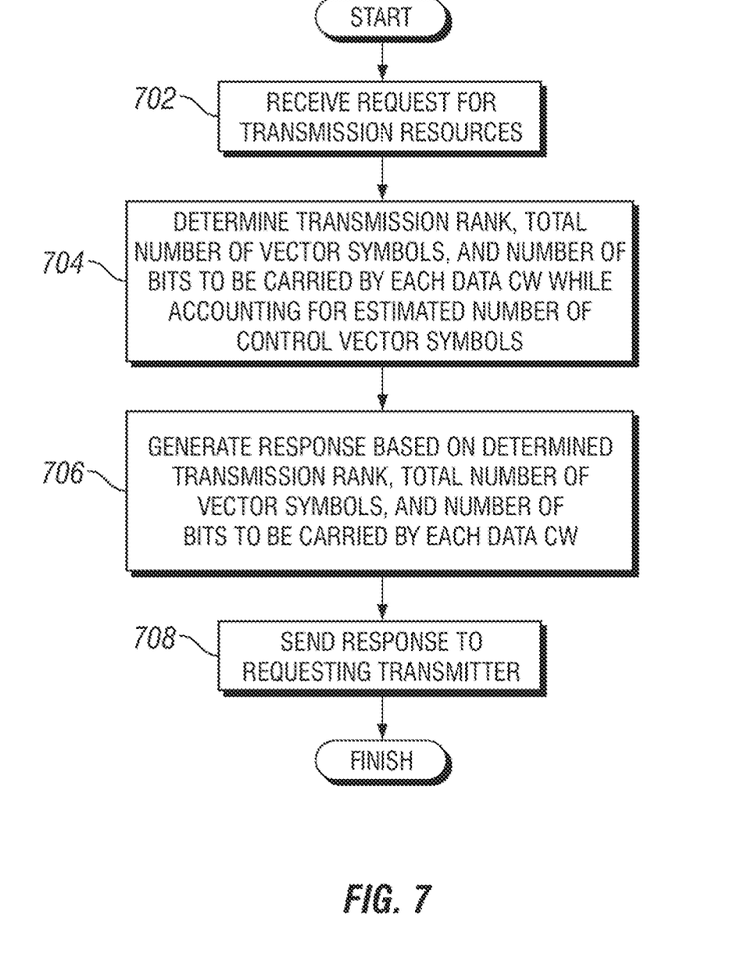
FIG. 7 is a flowchart showing example operation of a particular embodiment of the network node in scheduling transmissions of the transmitter.

Although the description above focuses on implementation of the described resource allocation techniques in a transmitter, the above concepts can also be applied at a receiver. For example, when decoding transmissions received from transmitter 100, a receiver may utilize certain aspects of the described techniques to estimate the amount of transmission resources that have been allocated to control signaling. Furthermore, the described concepts may be applied for purposed of scheduling use of transmission resources in wireless communication systems that utilize centralized resource management. For example, an eNode B may utilize certain aspects of the described techniques to estimate the amount of transmission resources a UE that incorporates transmitter 100 will allocate to control signaling for a given period of time or for a given amount of transmitted data. Based on this estimate, the eNode B may determine an appropriate number of transmission resources to schedule for use by the relevant UE. FIGS. 5-7 describe in greater detail the contents and operation or example devices capable of performing such receiving and/or scheduling. Additionally, although the description herein focuses on implementation of the described resource allocation techniques in wireless communication networks supporting LTE, the described resource allocation techniques may be utilized in conjunction with any appropriate communication technologies including, but not limited to LTE, High-Speed Packet Access plus (HSPA+), and Worldwide Interoperability for Microwave Access (WiMAX).

Figure 2:
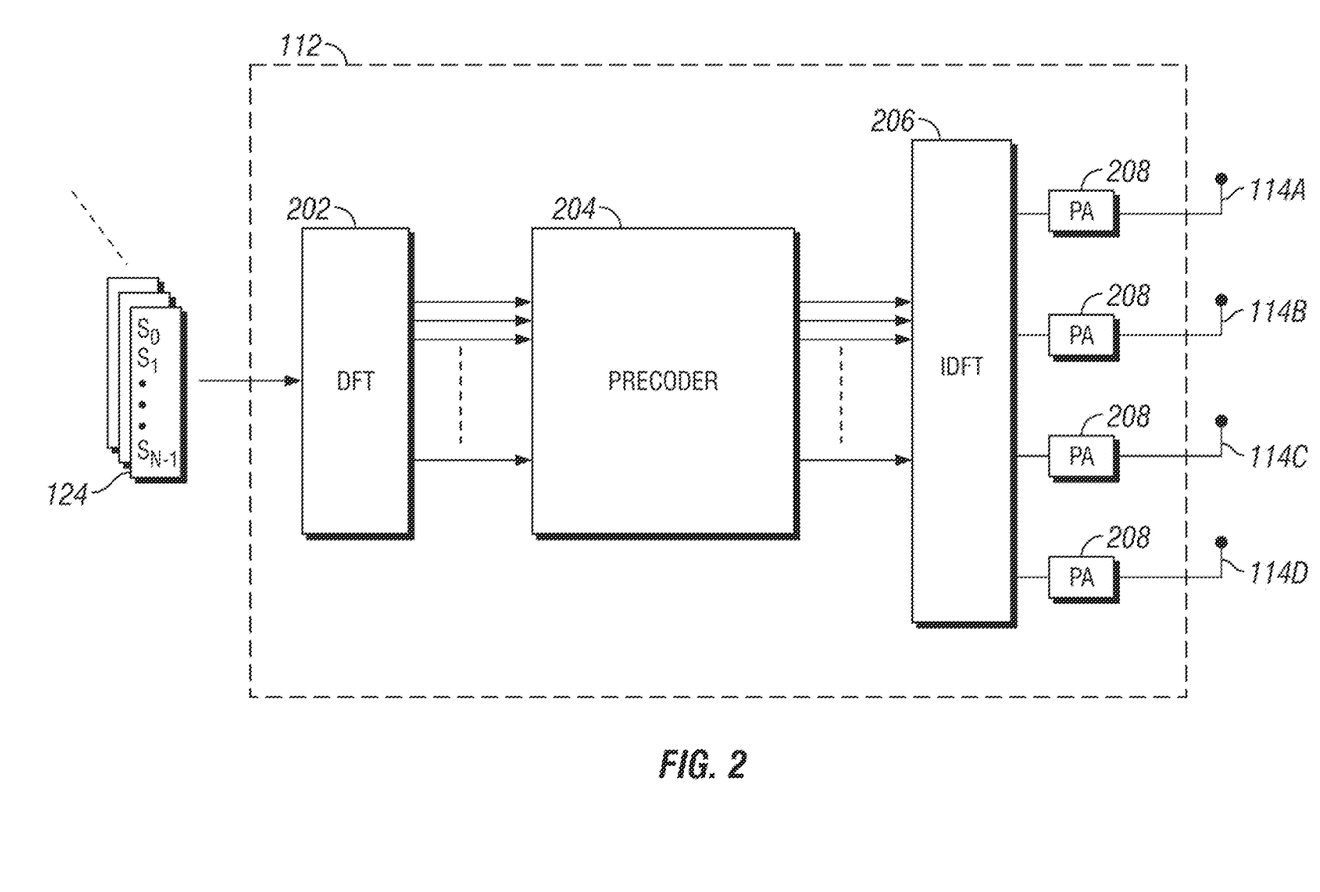
FIG. 2 is a functional block diagram illustrating a particular embodiment of a carrier modulator that may be used in the transmitter of FIG. 1.

FIG. 2 is a functional block diagram showing in greater detail the operation of a particular embodiment of carrier modulator 112. In particular, FIG. 2 illustrates an embodiment of carrier modulator 112 that might be used by an embodiment of transmitter 100 that utilizes DFTS-OFDM as required for uplink transmissions in LTE. Alternative embodiments may be configured to support any other appropriate type of carrier modulation. The illustrated embodiment of carrier modulator 112 includes a DFT 202, a precoder 204, an inverse DFT (IDFT) 206, and a plurality of power amplifiers (PAs) 208.

Carrier modulator 112 receives vector symbols 124 output by layer mapper 110. As received by carrier modulator 112, vector symbols 124 represent time domain quantities. DFT 202 maps vector symbols 124 to the frequency domain. The frequency-domain version of vector symbols 124 are then linearly precoded by precoder 204 using a precoding matrix, W, that is ($N_T \times r$) in size, where $N_T$ represents the number of transmission antennas 114 to be used by transmitter 100 and r represents the number of transmission layers that will be used by transmitter 100. This precoder matrix combines and maps the r information streams onto $N_T$ precoded streams. Precoder 204 then generates a set of frequency-domain transmission vectors by mapping these precoded frequency-domain symbols onto a set of sub-carriers that have been allocated to the transmission.

The frequency-domain transmission vectors are then converted back to the time domain by IDFT 206. In particular embodiments, IDFT 206 also applies a cyclic prefix (CP) to the resulting time-domain transmission vectors. The time-domain transmission vectors are then amplified by power amplifiers 208 and output from carrier modulator 112 to antennas 114, which are used by transmitter 100 to transmit the time-domain transmission vectors over a radio channel to a receiver.

Figure 3:
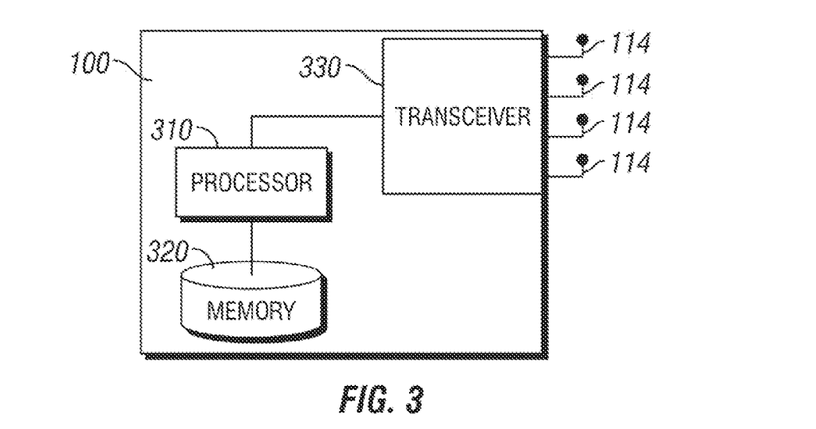
FIG. 3 is a structural block diagram showing the contents of a particular embodiment of the transmitter.

FIG. 3 is a structural block diagram showing in greater detail the contents of a particular embodiment of transmitter 100. Transmitter 100 may represent any suitable device capable of implementing the described resource allocation techniques in wireless communication. For example, in particular embodiments, transmitter 100 represents a wireless terminal, such as an LTE user equipment (UE). As shown in FIG. 3, the illustrated embodiment of transmitter 100 includes a processor 310, a memory 320, a transceiver 330, and a plurality of antennas 114.

Processor 310 may represent or include any form of processing component, including dedicated microprocessors, general-purpose computers, or other devices capable of processing electronic information. Examples of processor 310 include field-programmable gate arrays (FPGAs), programmable microprocessors, digital signal processors (DSPs), application-specific integrated circuits (ASICs), and any other suitable specific- or general-purpose processors. Although FIG. 3 illustrates, for the sake of simplicity, an embodiment of transmitter 100 that includes a single processor 310, transmitter 100 may include any number of processors 310 configured to interoperate in any appropriate manner. In particular embodiments, some or all of the functionality described above with respect to FIGS. 1 and 2 may be implemented by processor 310 executing instructions and/or operating in accordance with its hardwired logic.

Memory 320 stores processor instructions, equation parameters, resource allocations, and/or any other data utilized by transmitter 320 during operation. Memory 320 may comprise any collection and arrangement of volatile or non-volatile, local or remote devices suitable for storing data, such as random access memory (RAM), read only memory (ROM), magnetic storage, (ROM), magnetic storage, or any other suitable type of data storage components. Although shown as a single element in FIG. 3, memory 320 may include one or more physical components local to or remote from transmitter 100.

Transceiver 330 transmits and receives RF signals over antennas 340a-d. Transceiver 330 may represent any suitable form of RF transceiver. Although the example embodiment in FIG. 3 includes a certain number of antennas 340, alternative embodiments of transmitter 100 may include any appropriate number of antennas 340. Additionally, in particular embodiments, transceiver 330 may represent, in whole or in part, a portion of processor 310.

Figure 4:
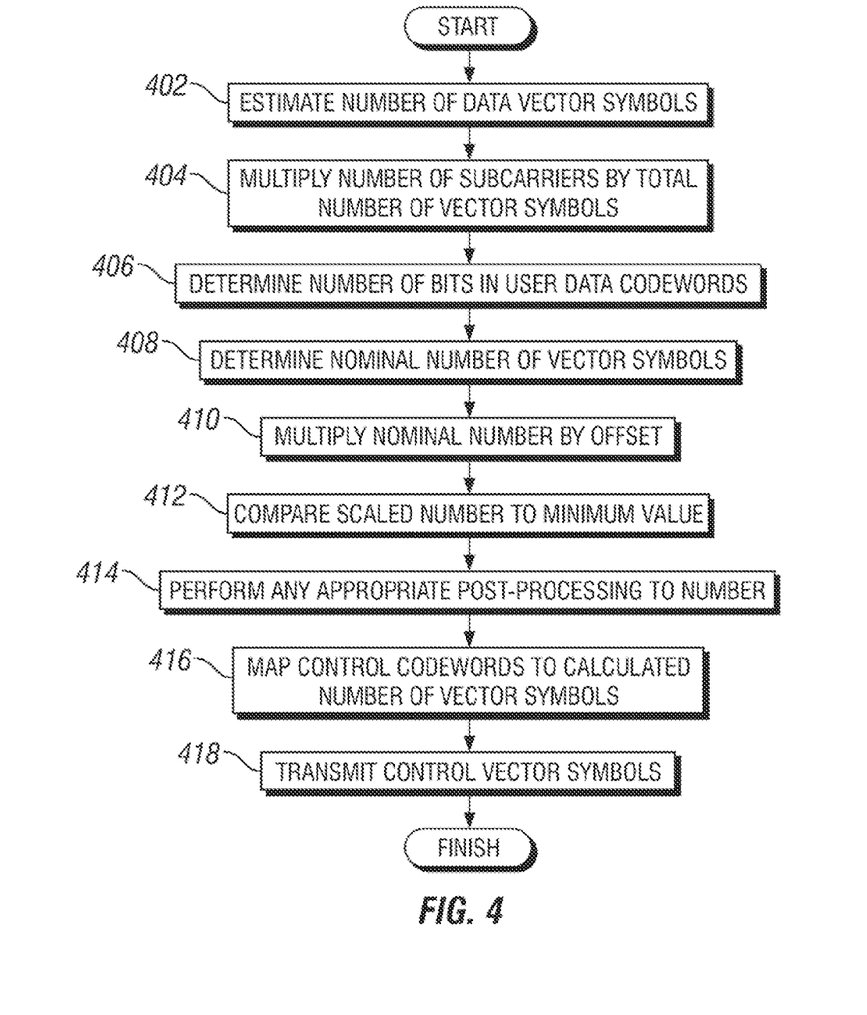
FIG. 4 is a flowchart detailing example operation of a particular embodiment of the transmitter.

FIG. 4 is a flowchart detailing example operation of a particular embodiment of transmitter 100. In particular, FIG. 4 illustrates operation of an embodiment of transmitter 100 in allocating transmission resources to the transmission of control codewords 120. The steps illustrated in FIG. 4 may be combined, modified, or deleted where appropriate. Additional steps may also be added to the example operation. Furthermore, the described steps may be performed in any suitable order.

Operation begins at step 402 with transmitter 100 estimating a number ($\hat{Q}_{data}$) of vector symbols 124 to be allocated to the transmission of user data codewords 122 during a subframe. As discussed above, transmitter 100 may estimate the number of vector symbols 124 to be allocated to user data codewords 122 in any suitable manner including, but not limited to, using any of the formulations of $\hat{Q}_{data}$ discussed above.

In some embodiments, transmitter 100 may estimate the number of vector symbols 124 to be allocated to user data codewords 122 by assuming that all of the transmission resources scheduled for use by transmitter 100 (e.g., based on a scheduling grant received by transmitter 100) during the relevant subframe will be used to transmit user data codewords 122. Thus, as part of step 404, transmitter 100 may multiply a total number of subcarriers allocated to transmitter 100 (e.g., $M_{sc}^{PUSCH-initial}$ in certain LTE embodiments) scheduled for use by transmitter 100 in the relevant subframe, and a total number of vector symbols allocated to transmitter 100 (e.g., $N_{symb}^{PUSCH-initial}$) to determine the total capacity allocated to transmitter 100 for the relevant subframe. If the transmission in question is a retransmission of previously transmitted information, the relevant values may relate to the total transmission resources allocated to transmitter 100 during the subframe in which the information was originally transmitted. Transmitter 100 may then use the resulting product as an estimate of the number of vector symbols 124 to be allocated to user data codewords 122, as to match the number of bits in the data codewords, which were generally scheduled with the original number of allocated vector symbols in mind.

At step 406, transmitter 100 determines a number of bits in a plurality of the user data codewords 122 to be transmitted during the subframe. In particular embodiments, user data codewords 122 may include CRC bits, and transmitter 100 may consider these CRC bits when counting the bits in the relevant user data codewords 122. Additionally, in particular embodiments, the plurality of user data codewords counted by transmitter 100 may represent all of the user data codewords 122 to be transmitted during the subframe. In alternative embodiments, however, this plurality of user data codewords 122 represent only a subset of the total number of user data codewords 122 to be transmitted during the subframe, e.g., as indicated by Equation (8) above. For example, in certain embodiments, transmitter 100 may determine the number of bits in step 406 based only on the user data codewords 122 to be transmitted on certain transmission layers. Thus, in such embodiments, transmitter 100 may, as part of step 406, identify the transmission layers over which transmitter 100 will transmit control codewords 120 during the subframe and then determine the total number of bits in only those user data codewords 122 that are to be transmitted over the identified transmission layers.

Transmitter 100 then calculates a number of vector symbols 124 to allocate to control signaling based at least in part on the estimated number of vector symbols 124 and the determined number of bits. As noted above, transmitter 100 may consider other appropriate values as well in making this calculation, such as the number of transmission layers to be used (e.g., as shown by Equations (6) and (7) above).

An example of how particular embodiments of transmitter 100 may perform this calculation is shown at steps 408-412 in FIG. 4. Specifically, in this example embodiment, transmitter 100, at step 408, determines a nominal number of vector symbols 124 to allocate to control information based, at least in part, on the estimated number of vector symbols allocated to user data codewords 122 and the determined number of bits in the control codewords 120 to be transmitted. In particular embodiments, transmitter 100 may also multiply this nominal number by an offset value (e.g., $\beta_{offset}^{PUSCH}$ in LTE embodiments) as part of calculating a final number of vector symbols 124 to allocate to control signaling, as shown at step 410. In particular embodiments, transmitter 100 may also compare the nominal number of control vector symbols (or the nominal number as scaled by any offset value) to a minimum number of control vector symbols 124 that transmitter 100 is configured to use in transmitting control codewords 120 at step 412. This minimum number of control vector symbols 124 may be a generic minimum threshold applied to all control codeword 120 transmissions or may be a minimum determined by transmitter 100 for this specific transmission (for example, based on the payload of the control codewords 120 to be transmitted). Transmitter 100 may additionally perform any appropriate post-processing to the number of vector symbols, such as converting the number to an integer value (e.g., applying a ceiling operation) or reducing the nominal value to satisfy a maximum permitted allocation for control signaling, as shown in step 414. Transmitter 100 may then use the output of these steps (and of any additional post-processing) as the final number of vector symbols 124 to allocate to control signaling. Alternatively or additionally, transmitter 100 may process any of the inputs used to determine the allocation (e.g., an estimated spectral efficiency for user data) to resulting a number calculated for control vector symbols is of an appropriate form (e.g., integer value) or within a particular range.

After determining the final number of vector symbols 124 to allocate to control signaling, transmitter 100 then maps control codewords 120 available for transmission to the calculated number of vector symbols 124 at step 416. Transmitter 100 may perform any appropriate processing of the control vector symbols 124 to permit transmission of the control vector symbols 124 to a receiver in communication with transmitter 100 including, for example, the processing described above with respect to FIG. 2. After completing any appropriate processing of vector symbols 124, transmitter 100 then transmits control vector symbols 124 over a plurality of transmission layers using the plurality of antennas 114 at step 418. Operation of transmitter 100 with respect to transmitting these particular control codewords 120 may then end as shown in FIG. 4.

FIG. 5 is a structural block diagram showing the contents of a network node 500 that may serve as a receiver for control codewords 120 transmitted by transmitter 100 and/or that may serve as a scheduler for scheduling transmission of control codewords 120 by transmitter 100. As noted above, the described resource allocation techniques may also be utilized by devices in decoding transmissions received from transmitter 100 or in determining the appropriate amount of transmission resources to schedule for use by transmitter 100 in a given subframe. For example, in particular embodiments, transmitter 100 may represent a wireless terminal (such as an LTE UE) and network node 500 may represent an element of a radio access network that receives uplink transmission from the wireless terminal or that is responsible for scheduling the wireless terminal's use of transmission resources (such as an LTE eNodeB).

As shown in FIG. 5, the illustrated embodiment of network node 500 includes a processor 510, a memory 520, a transceiver 530, and a plurality of antennas 540a-d. Processor 510, memory 520, transceiver 530, and antennas 540 may represent identical or analogous elements to the similarly-named elements of FIG. 3. In particular embodiments of network node 500, some or all of the functionality of network node 500 described below with respect to FIGS. 6 and 7 may be implemented by processor 510 executing instructions and/or operating in accordance with its hardwired logic.

FIG. 6 is a flowchart detailing example operation of a particular embodiment of network node 500. In particular, FIG. 6 illustrates operation of an embodiment of network node 500 in receiving and decoding control codewords 120 received from transmitter 100. The steps illustrated in FIG. 6 may be combined, modified, or deleted where appropriate. Additional steps may also be added to the example operation. Furthermore, the described steps may be performed in any suitable order.

Operation of network node 500 begins at step 602 with network node 500 receiving a plurality of vector symbols 124 from transmitter 100. For purposes of decoding the vector symbols 124, network node 500 may need to determine the manner in which transmitter 100 allocated these vector symbols 124 between control signaling and user data. As a result, network node 500 may determine the number of the received vector symbols 124 that transmitter 100 used to transmit control codewords 120.

To properly decode the received vector symbols 124, network node 500 may need to follow the same or an analogous procedure to what transmitter 100 used to determine the resource allocation on the transmitting side. Thus, depending on the configuration of the relevant transmitter 100, network node 500 may be configured to determine the number of vector symbols 124 allocated to control codewords 120 (referred to herein as "control vector symbols") using any of the techniques described above. An example of this process for the example embodiment is shown at steps 604-616 of FIG. 6. In particular, FIG. 6 describes operation of an embodiment of network node 500 that communicates with the transmitter 100 described by FIGS. 1-3. Thus, network node 500 performs steps 604-616 in a similar or analogous fashion to that described above for the similarly-captioned steps in FIG. 4.

After network node 500 has determined the final number of vector symbols 124 that transmitter 100 allocated to control codewords 120, network node 500 decodes the received vector symbols 124 based on this number at step 618. For example, network node 500 may use this information to determine which of the received vector symbols 124 are carrying control codewords 120 and which are carrying user data codewords 122. If transmitter 100 has encoded control signaling and user data using different encoding schemes, network node 500 may then apply a different decoding scheme to the two types of vector symbols 124. Operation of network node 500 with respect to decoding the received symbol vectors may then terminate as shown in FIG. 6.

FIG. 7 is a flowchart detailing example operation of a particular embodiment of network node 500 responsible for scheduling the use of transmission resources by transmitter 100. The steps illustrated in FIG. 7 may be combined, modified, or deleted where appropriate. Additional steps may also be added to the example operation. Furthermore, the described steps may be performed in any suitable order.

In FIG. 7, operation of network node 500 begins at step 702 with network node 500 receiving a request for transmission resources from transmitter 100. This request may represent any appropriate information indicating network node 500 has information, including one or both of control signaling and user data, to transmit in a geographic area served by network node 500. In particular embodiments, network node 500 may represent an LTE eNodeB and this request may represent a scheduling request transmitted by transmitter 100 on PUCCH. Additionally, network node 500 may possess information regarding transmissions transmitter 100 is expected to make during the relevant subframe. For example, in the relevant subframe, transmitter may expect a HARQ ACK/NACK transmission from transmitter 100 responding to a previous transmission from network node 500. Alternatively or additionally, in particular embodiments, the scheduling request received by network node 500 may indicate the amount and/or type of information transmitter 100 is intending to transmit.

In response to receiving the request, network node 500 may determine an allocation of transmission resources to grant to transmitter 100 for use in transmitting the requested transmission. To determine this allocation, network node 500 may determine the amount of control information and user data network node 500 expects transmitter 100 to transmit in conjunction with the request. Network node 500 may determine these amounts based on information included in the request itself, information maintained locally by network node 500 itself (e.g., information on expected control information transmissions), and/or information received from any other suitable source.

Furthermore, in particular embodiments, network node 500 determines this overall allocation based on the assumption that transmitter 100 will determine an allocation for control vector symbols for the requested transmission based on the techniques described above. Thus, network node 500 may also use the techniques above to grant an appropriate amount of transmission resources to transmitter 100 for the requested transmission. Because the above techniques may involve transmitter 100 determining an allocation of control vector symbols that depends in part on the allocation of user data vector symbols, network node 500 may likewise estimate the control allocation based on an estimate allocation for use data. This may result in network node 500 determining a total allocation for transmitter 100 comprised of a user data allocation and a control information allocation, which itself depends on the user data allocation. Thus, in particular embodiments, network node 500 may determine the total allocation recursively. An example of this is shown by step 704 of FIG. 7.

At step 704, network node determines a transmission rank, a total number of vector symbols to be used by transmitter 100 for the requested transmission, and a number of bits of user data to be carried by each of a plurality of data codewords to be transmitted as part of the requested transmission. In particular embodiments, the determination of the transmission rank, the total number of vector symbols, and the number of bits carried by each data codeword accounts for an estimated number of control vector symbols that will result from this determination. Thus, as part of step 704, network node 500 may determine the estimated number of control vector symbols by estimating the number of user data vector symbols to be used in transmitting the user data codewords, estimating the number of hits in the control codewords 120 to be transmitted, and calculating the number of control vector symbols based on the estimated number of user data vector symbols, the estimated number of bits in control codewords 120, and the number of bits of user data to be carried by each of the user data codewords.

Depending on the configuration of transmitter 100, network node 500 may process the estimated number of control vector symbols in an appropriate manner as described above before using the value to make the determination of step 704. For example, network node 500 may calculate a nominal number of control vector symbols based on the estimated number of data vector symbols, the estimated number of bits of control codewords 120, and the number of bits of user data to be carried by each of the user data codewords. Network node 500 may then scale this nominal number by an offset, increase the nominal number to meet a minimum number, apply a ceiling operation to the nominal, and/or perform any other appropriate processing of the nominal number to calculate the final estimated number of control vector symbols.

Network node 500 then uses this determination in responding to the request sent by transmitter 100. In particular embodiments, if network node 500 decides to grant the request, network node 500 may communicate aspects of the determined allocation to transmitter 100. Therefore, in particular embodiments, network node 500 may respond to the request by generating a particular response (e.g., a scheduling grant) to the request based on the determined allocation and transmitting the response to transmitter 100, as shown by steps 706-708 of FIG. 7. For example, in certain LTE embodiments, network node 500 may generate a scheduling grant that includes information indicating the determined transmission rank, the determined total number of vector symbols, and the number of bits to be used for each data codeword and send this scheduling grant to transmitter 100. Alternatively or additionally, network node 500 may use the determined allocation in deciding whether to grant the request or in deciding how to prioritize the request. Operation of network node 500 with respect to scheduling transmitter 100 for this subframe may then terminate as shown in FIG. 7.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for wirelessly transmitting user data and control information using a plurality of transmission layers, comprising:

estimating a number of vector symbols to be allocated to transmission of user data codewords during a subframe;

determining a number of bits in a plurality of user data codewords to be transmitted during the subframe;

calculating a number of control vector symbols to allocate to control information based at least in part on the estimated number of vector symbols and the determined number of bits;

mapping one or more control codewords to the calculated number of control vector symbols, wherein the one or more control codewords comprise encoded control information; and transmitting vector symbols carrying the user data codewords and the control codewords over the plurality of transmission layers during the subframe.

2. The method of claim 1, wherein determining the number of bits in the plurality of user data codewords comprises calculating a total number of bits in all of the user data codewords to be transmitted during the subframe.

3. The method of claim 2, wherein the calculated number of control vector symbols is inversely proportional to the total number of bits in all of the user data codewords to be transmitted during the subframe.

4. The method of claim 1, wherein determining the number of bits in a plurality of the user data codewords comprises calculating a total number of bits in a subset of the user data codewords to be transmitted during the subframe.

5. The method of claim 4, wherein calculating the total number of bits in a subset of the user data codewords comprises:
identifying the transmission layers over which control codewords will be transmitted during the subframe; and
calculating the total number of bits in a subset of the user data codewords that will be transmitted over the identified transmission layers.

6. The method of claim 1, wherein estimating the number of vector symbols to be allocated to the plurality of user data codewords comprises:
multiplying a total number of subcarriers allocated to a wireless terminal for transmitting data and control during the subframe by a total number of vector symbols allocated to the wireless terminal for transmitting data and control during the subframe to determine a total amount of transmission resources granted to the wireless terminal in the corresponding subframe; and
estimating the number of vector symbols to be allocated to the plurality of user data codewords based on the total amount of transmission resources granted to the wireless terminal in the corresponding subframe.

7. The method of claim 1, wherein calculating the number of control vector symbols to allocate to control information comprises:
determining a number of transmission layers over which the codewords of user data will be transmitted; and
calculating the number of control vector symbols to allocate to control information based, at least in part, on the estimated number of vector symbols, the determined number of bits, and the determined number of layers.

8. The method of claim 1, wherein calculating the number of control vector symbols to allocate to control information comprises:
determining a nominal number of control vector symbols to allocate to control information based, at least in part, on the estimated number of vector symbols and the determined number of bits; and
determining a final number of control vector symbols by multiplying the nominal number of control vector symbols and an offset value; and wherein mapping one or more control codewords to the calculated number of control vector symbols comprises mapping the one or more control codewords to the final number of control vector symbols.

9. The method of claim 1, wherein calculating the number of control vector symbols to allocate to control information comprises:
determining a nominal number of control vector symbols to allocate to control information based, at least in part, on the estimated number of vector symbols and the determined number of bits; and
determining a final number of control vector symbols by selecting the greater of the nominal number of control vector symbols and a minimum number of control vector symbols.

10. The method of claim 1, wherein calculating a number of control vector symbols to allocate to control information comprises:
determining, for each of the user data codewords, a payload-per-layer value by dividing a number of bits in that user data codeword by a number of layers over which that user data codeword will be transmitted; and
selecting a lowest of the payload-per-layer values for the plurality of user data codewords; and
determining a number of control vector symbols to allocate to control information based on the estimated number of vector symbols and the lowest of the payload-per-layer values for the user data codewords.

11. The method of claim 10, wherein the calculated number of control vector symbols is inversely proportional to the lowest of the payload-per-layer values.

12. A method for receiving user data and control information transmitted wirelessly over a plurality of transmission layers, comprising:
receiving a plurality of vector symbols over a plurality of transmission layers, wherein the vector symbols carry user data codewords and control codewords;
estimating a number of the vector symbols that have been allocated to user data codewords;
determining a number of bits in a plurality of user data codewords carried by the vector symbols;
calculating a number of control vector symbols that have been allocated to control information based at least in part on the estimated number of vector symbols and the determined number of bits; and
decoding the received vector symbols based on the calculated number of control vector symbols.

13. The method of claim 12, wherein determining the number of bits in the plurality of user data codewords comprises calculating a total number of bits in all of the user data codewords to be transmitted during the subframe.

14. The method of claim 13, wherein the calculated number of control vector symbols is inversely proportional to the total number of bits in all of the user data codewords to be transmitted during the subframe.

15. The method of claim 12, wherein determining the number of bits in a plurality of user data codewords carried by the vector symbols comprises calculating a total number of bits in a subset of the received user data codewords.

16. The method of claim 15, wherein calculating the total number of bits in a subset of the received user data codewords comprises:
identifying the transmission layers over which control codewords were received; and
calculating the total number of bits in a subset of the user data codewords were received over the identified transmission layers.

17. The method of claim 12, wherein estimating the number of vector symbols that have been allocated to the plurality of user data codewords comprises:
multiplying a total number of subcarriers allocated to a wireless terminal for transmitting data and control during the subframe by a total number of vector symbols allocated to the wireless terminal for transmitting data and control during the subframe to determine a total amount of transmission resources granted to the wireless terminal in the corresponding subframe; and estimating the number of vector symbols that have been allocated to the plurality of user data codewords based on the total amount of transmission resources granted to the wireless terminal in the corresponding subframe.

18. The method of claim 12, wherein calculating the number of control vector symbols that have been allocated to control information comprises:
determining a number of transmission layers over which the codewords of user data have been received; and
calculating the number of control vector symbols that have been allocated to control information based, at least in part, on the estimated number of vector symbols, the determined number of bits, and the determined number of layers.

19. The method of claim 12, wherein calculating the number of control vector symbols that have been allocated to control information comprises:
determining a nominal number of control vector symbols based, at least in part, on the estimated number of vector symbols and the determined number of bits; and
determining a final number of control vector symbols that have been allocated to control information by multiplying the nominal number of control vector symbols and an offset value; and wherein decoding the received vector symbols based on the calculated number of control vector symbols comprises decoding control information carried by a number of control vector symbols equal to the final number.

20. The method of claim 12, wherein calculating the number of control vector symbols that have been allocated to control information comprises:
determining a nominal number of control vector symbols based, at least in part, on the estimated number of vector symbols and the determined number of bits; and
determining a final number of control vector symbols that have been allocated to control information by selecting the greater of the nominal number of control vector symbols and a minimum number of control vector symbols.

21. The method of claim 12, wherein calculating a number of control vector symbols that have been allocated to control information comprises:
determining, for each of the user data codewords, a payload-per-layer value by dividing a number of bits in that user data codeword by a number of layers over which that user data codeword was received;
selecting a lowest of the payload-per-layer values for the plurality of user data codewords; and
determining a number of control vector symbols that have been allocated to control information based on the estimated number of vector symbols and the lowest of the payload-per-layer values for the user data codewords.

22. The method of claim 21, wherein the calculated number of control vector symbols is inversely proportional to the lowest of the payload-per-layer values.

23. A method of scheduling wireless transmissions over a plurality of transmission layers, comprising:
receiving a scheduling request from a transmitter requesting use of transmission resources to transmit a plurality of vector symbols;
determining a transmission rank, a total number of vector symbols to be used for user data and control information, and a number of bits of user data to be carried by each of the user data codewords, accounting, at least in part, for an estimated number of control vector symbols, wherein the estimated number of control vector symbols is determined by:
estimating a number of user data vector symbols to be used in transmitting the user data codewords;
estimating a number of bits in one or more control codewords to be transmitted, wherein the one or more control codewords comprise encoded control information; and
calculating the estimated number of control vector symbols to be used in transmitting the user data codewords based at least in part on the estimated number of user data vector symbols to be used in transmitting the user data codewords, the estimated number of bits in the one or more control codewords, and the number of bits of user data to be carried by each of the user data codewords;
generating a response to the scheduling request based on the determined transmission rank, total number of vector symbols, and number of bits of each user data codeword; and
transmitting the response to the transmitter.

24. An apparatus for wirelessly transmitting user data and control information using a plurality of transmission layers, the apparatus comprising:
a plurality of antennas;
a transmitter operable to transmit vector symbols over a plurality of transmission layers using the plurality of antennas; and
a processor operable to:
estimate a number of vector symbols to be allocated to transmission of user data codewords during a subframe;
determine a number of bits in a plurality of user data codewords to be transmitted during the subframe;
calculate a number of control vector symbols to allocate to control information based at least in part on the estimated number of vector symbols and the determined number of bits;
map one or more control codewords to the calculated number of control vector symbols, wherein the one or more control codewords comprise encoded control information; and
transmit vector symbols carrying the user data codewords and the control codewords over the plurality of transmission layers during the subframe.

25. A node for receiving user data and control information transmitted wirelessly over a plurality of transmission layers, the node comprising:
a plurality of antennas;
a receiver operable to transmit vector symbols over a plurality of transmission layers using the plurality of antennas; and
a processor operable to:
receive a plurality of vector symbols over a plurality of transmission layers using the receiver, wherein the vector symbols carry user data codewords and control codewords;
estimate a number of the vector symbols that have been allocated to user data codewords;
determine a number of bits in a plurality of user data codewords carried by the vector symbols;
calculate a number of control vector symbols that have been allocated to control information based at least in part on the estimated number of vector symbols and the determined number of bits; and
decode the received vector symbols based on the calculated number of control vector symbols.

26. A node for scheduling wireless transmissions over a plurality of transmission layers, the node comprising:
- a receiver operable to receive information from a wireless terminal;
- a transmitter operable to transmit information to the wireless terminal; and
- a processor operable to:
    - receive a scheduling request from the wireless terminal using the receiver, the scheduling request requesting use of transmission resources to transmit a plurality of vector symbols;
    - determine a transmission rank, a total number of vector symbols to be used for user data and control information, and a number of bits of user data to be carried by each of the user data codewords, accounting, at least in part, for an estimated number of control vector symbols, wherein the processor is operable to determine the estimated number of control vector symbols by:
        - estimating a number of user data vector symbols to be used in transmitting the user data codewords;
        - estimating a number of bits in one or more control codewords to be transmitted, wherein the one or more control codewords comprise encoded control information; and
        - calculating the estimated number of control vector symbols to be used in transmitting the user data codewords based at least in part on the estimated number of user data vector symbols to be used in transmitting the user data codewords, the estimated number of bits in the one or more control codewords, and the number of bits of user data to be carried by each of the user data codewords;
    - generate a response to the scheduling request based on the determined transmission rank, total number of vector symbols, and number of bits of each user data codeword; and
    - transmit the response to the wireless terminal using the transmitter.

* * * * *

UNITED STATES PATENT AND TRADEMARK OFFICE
CERTIFICATE OF CORRECTION

PATENT NO. : 8,634,365 B2  
APPLICATION NO. : 13/095313  
DATED : January 21, 2014  
INVENTOR(S) : Hammarwall et al.

Page 1 of 1

It is certified that error appears in the above-identified patent and that said Letters Patent is hereby corrected as shown below:

In the Specification

In Column 1, Line 4, delete "& 119(e)" and insert -- § 119(e) --, therefor.

In Column 7, Line 46, delete "use, a" and insert -- use a --, therefor.

In Column 10, Line 53, delete "or example" and insert -- of example --, therefor.

In Column 11, Line 59, delete "transmitter 320" and insert -- transmitter 100 --, therefor.

In Column 11, Line 63, delete "(ROM), magnetic storage," and insert -- optical storage, --, therefor.

In Column 16, Line 2, delete "hits" and insert -- bits --, therefor.

Signed and Sealed this  
Fifteenth Day of July, 2014

Michelle K. Lee  
*Deputy Director of the United States Patent and Trademark Office*